United States Patent
Yang

(10) Patent No.: US 7,153,461 B2
(45) Date of Patent: Dec. 26, 2006

(54) ADHESIVE TAPE ENABLING PATTERNS AND MARKS TO BE FORMED THEREON AND MANUFACTURING METHOD

(75) Inventor: Shih-Sheng Yang, Taipei Hsien (TW)

(73) Assignee: Universal Trim Supply Co., Ltd., Hsinchuang (TW)

( * ) Notice: Subject to any disclaimer, the term of this patent is extended or adjusted under 35 U.S.C. 154(b) by 169 days.

(21) Appl. No.: 10/853,219

(22) Filed: May 26, 2004

(65) Prior Publication Data

US 2005/0266236 A1     Dec. 1, 2005

(51) Int. Cl.
B29C 45/16 (2006.01)
B29C 45/27 (2006.01)

(52) U.S. Cl. .................. 264/257; 264/263; 264/266; 264/269; 264/271.1; 264/328.1

(58) Field of Classification Search .............. 264/263, 264/266, 269, 271.1, 328.1
See application file for complete search history.

(56) References Cited

U.S. PATENT DOCUMENTS 4,126,292 A * 11/1978 Saeki et al. ................ 249/110

5,158,729 A * 10/1992 Gemeinhardt et al. ...... 264/138

FOREIGN PATENT DOCUMENTS

JP          02-261613      * 10/1990

* cited by examiner

Primary Examiner—Stefan Staicovici
(74) Attorney, Agent, or Firm—Leong C. Lei

(57) ABSTRACT

A method for manufacturing adhesive tape that pattern and mark are easily formed thereon which includes the steps of placing a felted surface of a felt portion on the bearing portion of a lower mold, alter closing the upper mold, injecting a plastic material via high pressure to merge to the back side of the felted surface, thereby the plastic board can be integrally combined wit the back side of the felted surface to obtain the best combined strength. The plastic board can be formed with specific patterns or marks as desired, such that the adhesive tape can have a hard strip to make it easier for the user to detach, even if the user is wearing heavy gloves. In addition, a logo or mark can be formed on the adhesive tape to enhance the aesthetic effect.

1 Claim, 6 Drawing Sheets

ADHESIVE TAPE ENABLING PATTERNS AND MARKS TO BE FORMED THEREON AND MANUFACTURING METHOD

BACKGROUND OF THE INVENTION (a) Technical Field of the Invention

The present invention relates to an adhesive tape on which patterns and marks can be easily formed and its manufacturing method thereof, more particularly to a method for integrally forming the felted surface of an adhesive tape and a plastic board for supporting the back side, without the need of a second sewing procedure. The invention is applicable to heavy snow coats, gloves, shoes and boots, backpacks and other utilities for outdoor sports; and can make it easier for the user to seal the adhesive tape, which has excellent combined strength, without taking off the gloves.

(b) Description of the Prior Art

Generally, the felted portion of an adhesive tape of the prior art is mainly composed of a felt surface and a relatively hard strip, both of which are separately formed before being stacked up and sewed with threads to combine together. The felted portion (i.e. the male adhesive tape) is adapted to the corresponding thread-implanted portion (i.e. the female adhesive tape) to obtain a purpose of easy attachment and detachment. However, as the felted portion is sewed to combine, it is rather uneconomic since it is troublesome in process. Besides, given the weak combined strength between the felt surface and the strip, the two elements used to detach from each other after a short period of use or an instant pull by force. When applying to articles of outdoor sports, the user with heavy gloves would have difficulty in drawing the adhesive tape which is thin and soft for easing the sewing work, and thus making it inconvenient for the user. In view of the disadvantages existing in the prior art, the inventor has researched and developed the improved embodiments, as disclosed in the present invention.

SUMMARY OF THE INVENTION

The primary object of the invention is to obtain the best combined strength, lessen the sewing procedure, efficiently simplify the process, and reduce the costs.

Another object of the invention is to make it easier for the user to attach and detach the adhesive tape by means of the felt portion.

To obtain the above objects, the invention discloses an adhesive tape on which pattern and mark are easily formed and its manufacture thereof. The method of manufacture includes placing a felted surface with uneven hooked felt of a felt portion on the bearing portion of a lower mold, the lining mold cave of which is provided with a butting mold having pluralities of aciculae for the purposes of positioning and supporting. After the upper mold is closed, a plastic material is injected via high pressure to merge to the back side of the felted surface, thereby the plastic board can be integrally combined with the back side of the felted surface. The plastic board can be formed with specific pattern or mark as desired, such that the adhesive tape can have a hard strip to ease the user to draw, even if the user is wearing heavy gloves. In addition, a logo or mark can be formed on the adhesive tape to enhance the aesthetic effect.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
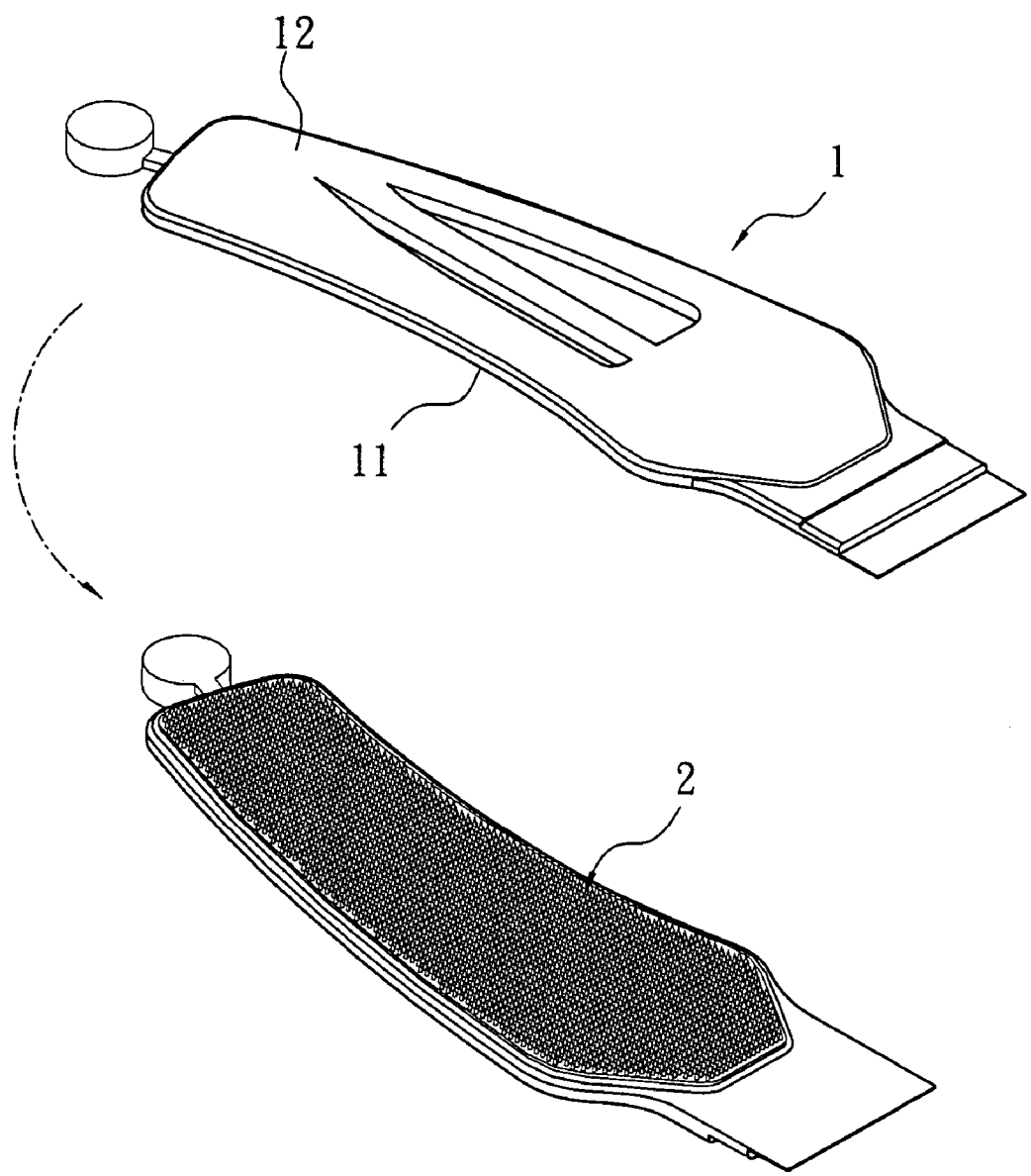
FIG. 1 is a perspective view of the adhesive tape according to the present invention.
Figure 2:
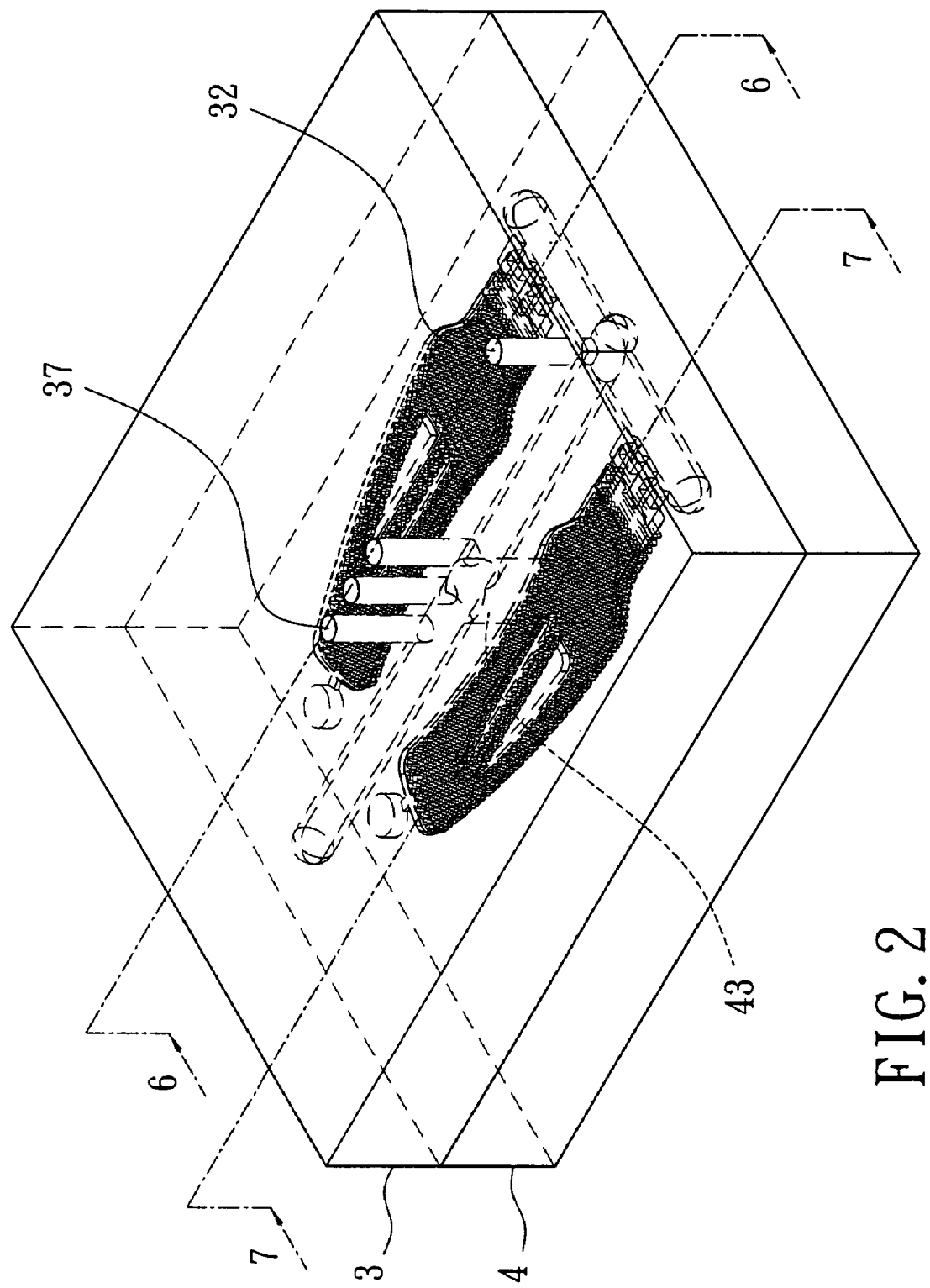
FIG. 2 is a perspective view of the upper and lower molds according to the present invention.
Figure 3:
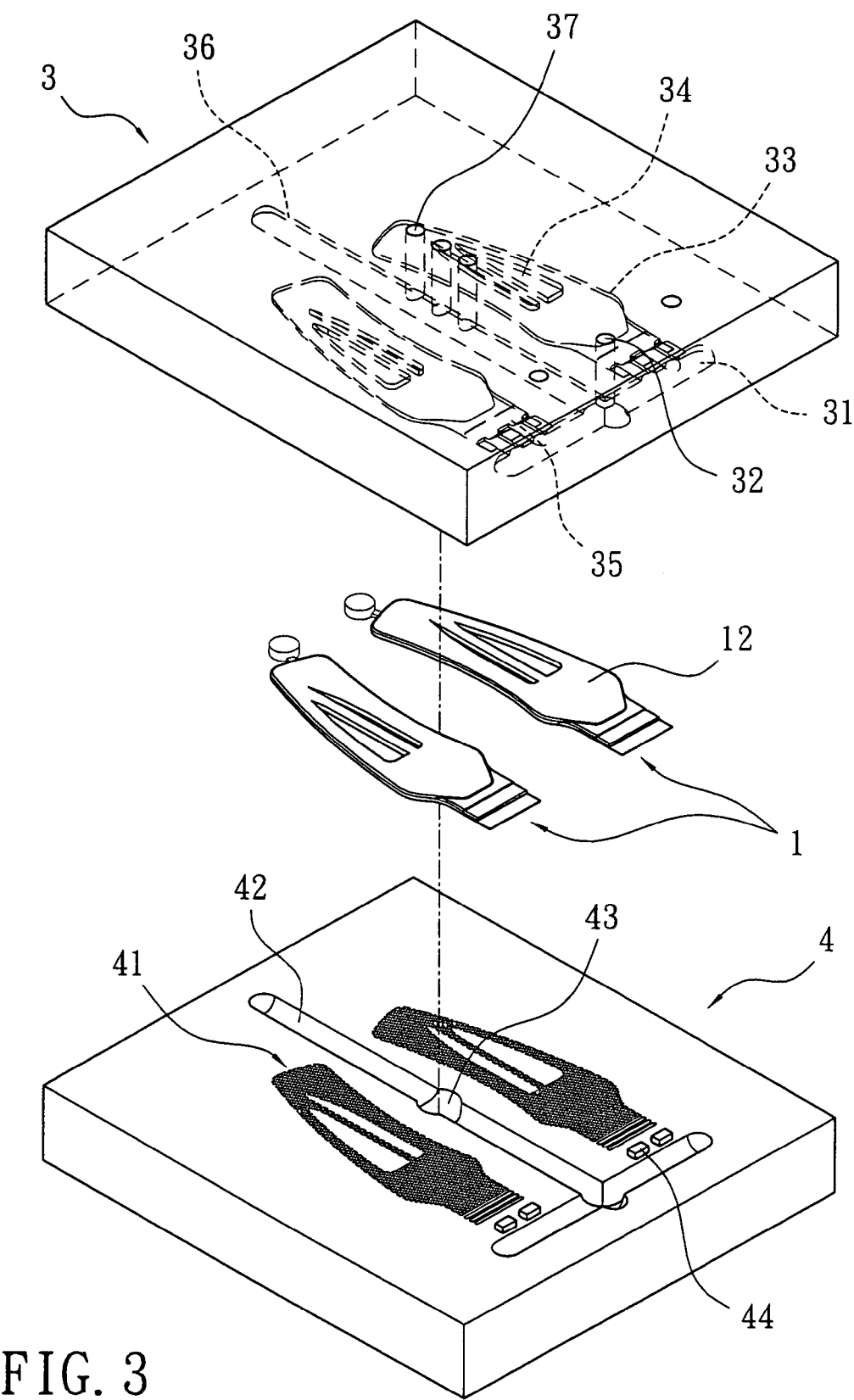
FIG. 3 is a perspective view of the upper and lower molds according to the present invention.
Figure 4:
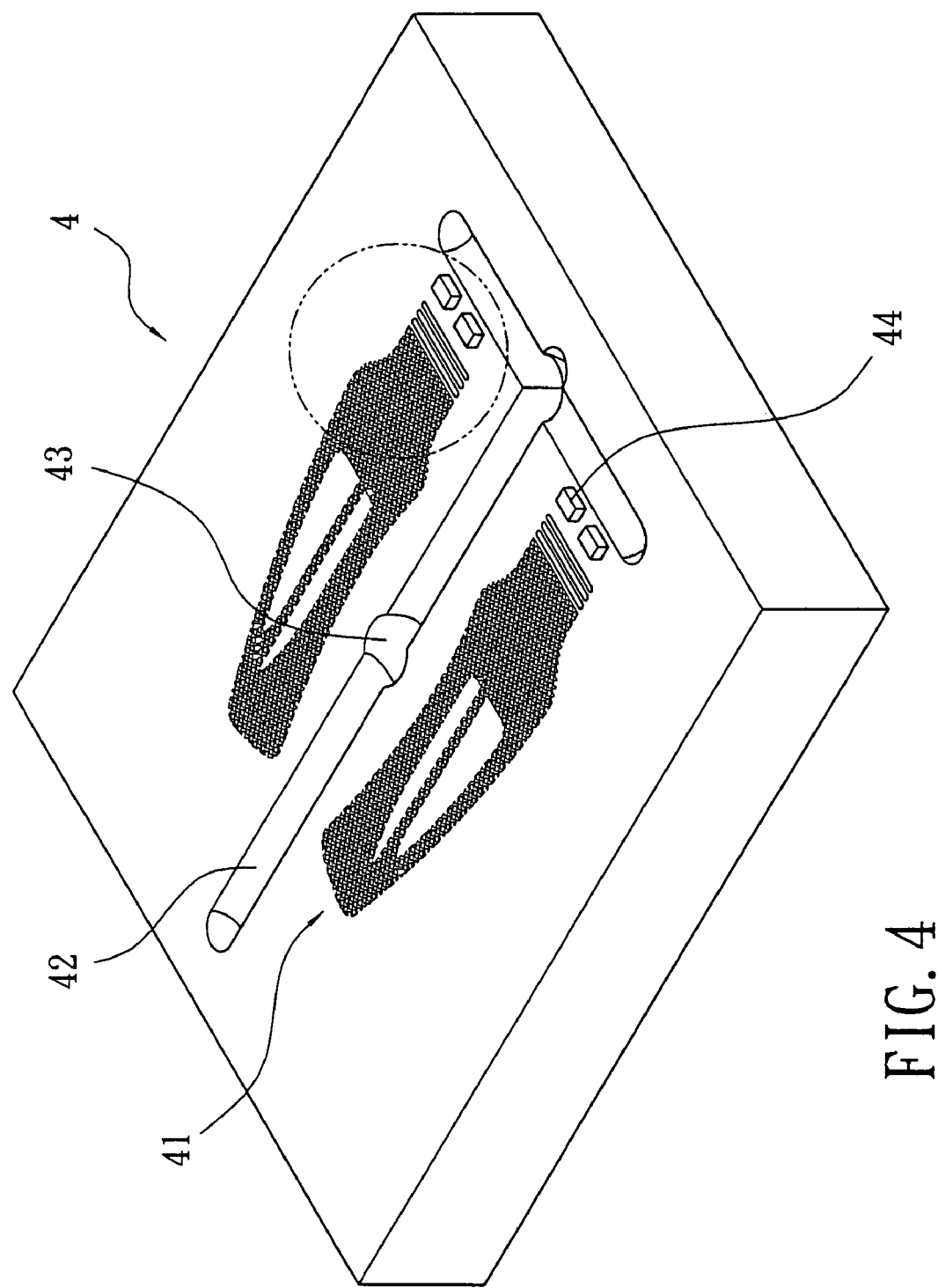
FIG. 4 is a perspective view of the lower mold according to the present invention.
Figure 5:
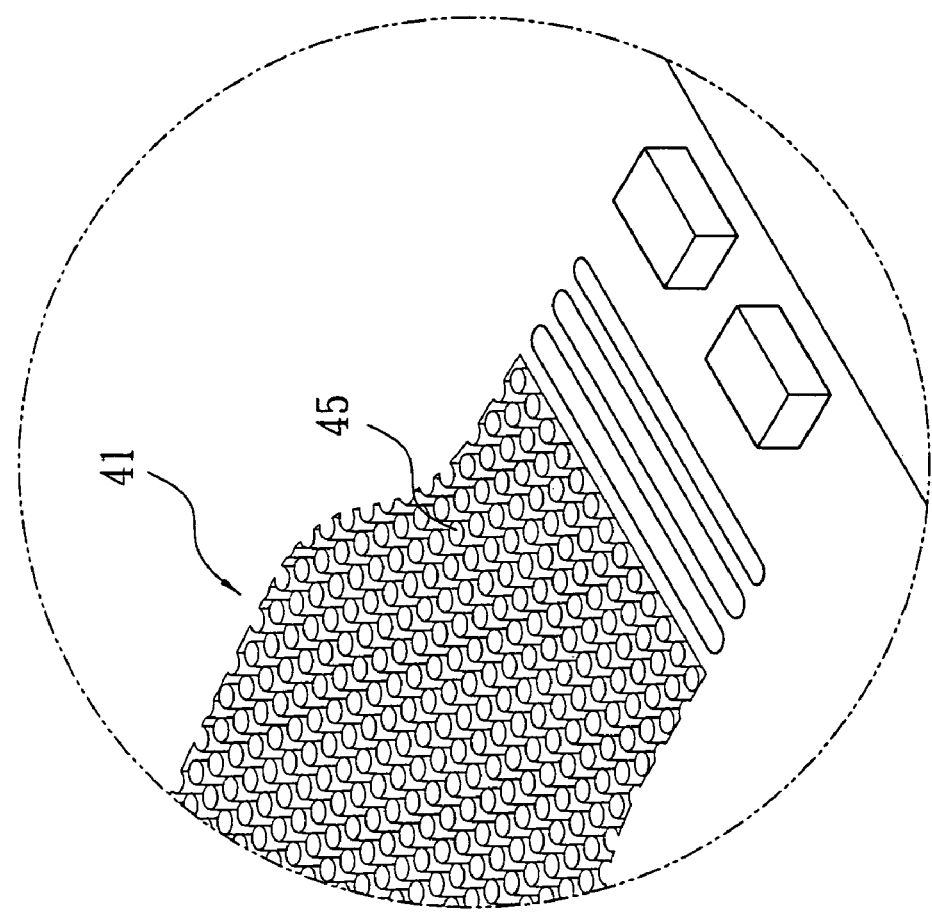
FIG. 5 is an enlarged view taken from FIG. 4.
Figure 6:
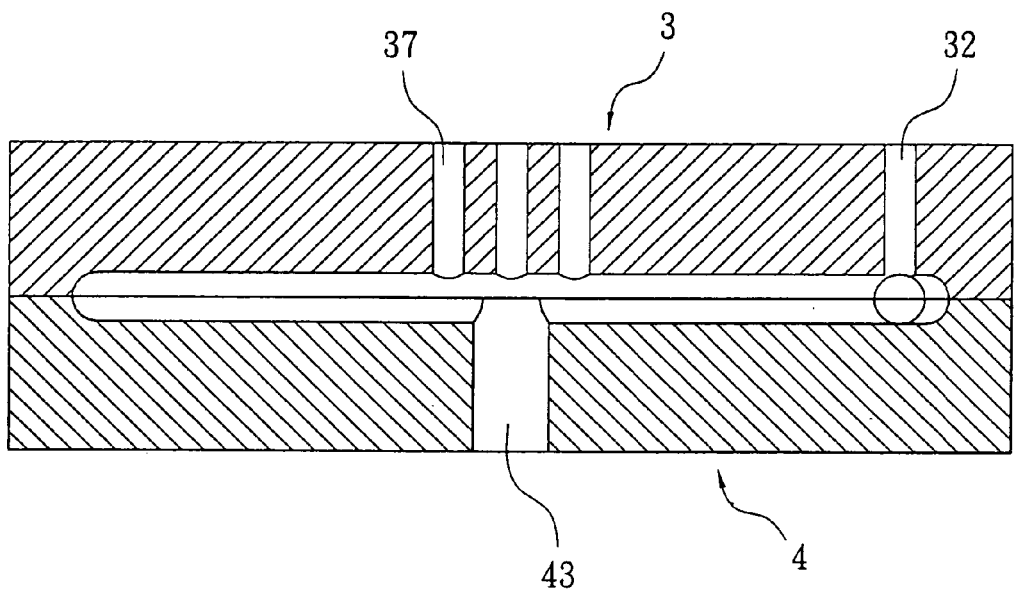
FIG. 6 is cut-away view taken from line 6—6 of FIG. 2.
Figure 7:
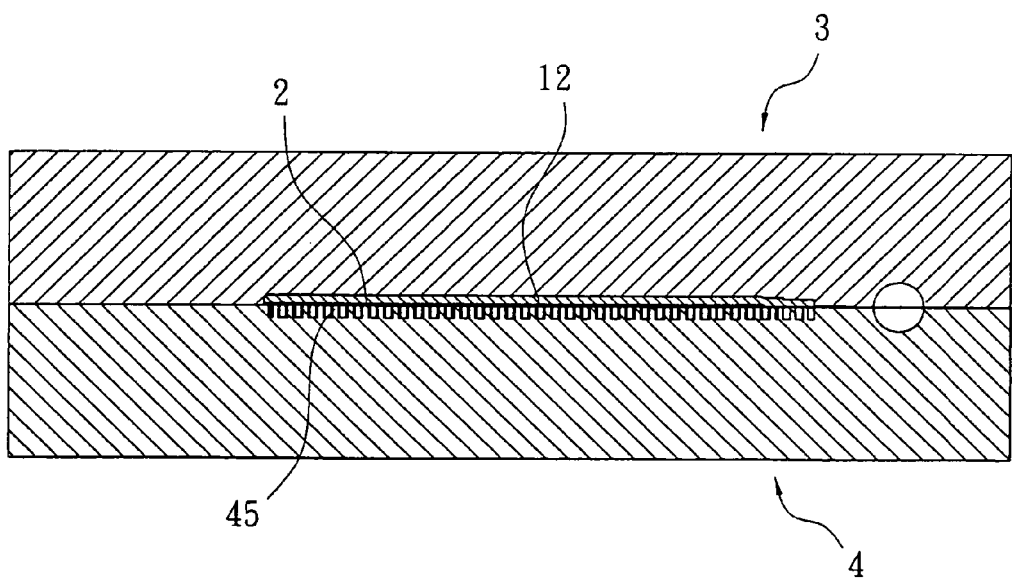
FIG. 7 is cut-away view taken from line 7—7 of FIG. 2.

FIGS. 1 to 7 are the perspective view of the adhesive tape, the perspective view of the upper and Lower molds, the perspective view of the upper and lower molds, the perspective view of the lower mold, the enlarged view taken from FIG. 4, the cut-away view taken from line 6—6 of FIG. 2, and the cut-away view taken from line 7—7 of FIG. 2, respectively. As illustrated, the invention discloses an adhesive tape that pattern and mark are easily formed thereon and the manufacture thereof. The adhesive tape is mainly composed of a felt portion 1 and a thread-implanted portion 2, wherein one side of the felt portion 1 has a felt surface 11 and the other side is provided with a plastic board 12 with a pattern. The plastic board 12 is directly formed on the back side of the felt surface 11 by way of plastic injection, such that the plastic board 12 with the pattern can integrally combine to the back side of the felt surface 11 to accomplish an adhesive tape that pattern and mark can be easily formed thereon. Accordingly, the user can easily attach and draw the adhesive tape by means of the thread-implanted portion 2. Beside, a logo or trademark can be formed on the exposed surface of the board 12 for promotional and advertising purposes. The method according to the invention includes the following steps:

taking an upper mold 3 and a lower mold 4, among which one end of the upper mold 3 is provided with a guide groove 31, the center thereof being provided with a sprue 32, and above the upper mold 3 adjacent to the guide groove 31 are provided with more than one formation areas 33, which are respectively provided with a pattern portion 34 and are connected with the guide groove 31 by way of more than one paths 35; a groove 36 having a through hole 37 above is provided between the formation areas 33 of the upper mold 3, while the lower mold 4 has more than one bearing portions 41 corresponding to the formation areas 33 and provided with a plurality of extruding blocks 44;

placing a felt portion 1 on the bearing portion 41 of the lower mold 4 with the felt surface 11, which is provided with a butting mold 45 having pluralities of aciculae, contacting with the bearing portion 41; and then placing the upper mold 3 correspondingly on the lower mold 4 such that the back side of the felt portion 1 can be corresponding to the formation area 33 on the upper mold 3; injecting a plastic material from the sprite 32 through the guide groove 31 to the formation area 33, such that the plastic material can be formed on the back side of the felt portion 1 to shape into a plastic board 12;

butting and removing the upper mold 3 by inserting a tool (not shown) through the aperture 43 of the groove 42 on the lower mold 4, such that a pattern 34 as that on the formation area 33 can be obtained by way of plastic formation on the plastic board 12 on the back side of the felt portion 1; accordingly, the plastic board 12 will automatically become an integration with the felt surface 1 after its formation; when in use, the hard plastic board 12 combined with the adhesive tape can allow the user to easily draw.

Besides, the manufacture method for constructing an adhesive tape that pattern and mark are easily formed thereon can reach the purposes of obtaining the best combined strength, lessening the sewing work efficiently simplifying the process, and reducing the costs.

The user can directly hold the plastic board 12 to control the felt surface 11 and the corresponding threads on the thread-implanted portion 2 for link up or separation purposes by way of the design of integral formation of the felt surface 11 and the plastic board 12, which can obtain the best combined strength, lessen the sewing work, efficiently simplify the process, and reduce the costs.

The invention can be applied to articles that require instant link up and separation, such as the collars and sleeves of snow coats, children's sneakers, skates and gloves, etc. The user can easily detach the adhesive tape even if he/she is wearing heavy gloves. As the adhesive tape can be easily detached, the life of use thereof would be greatly enhanced in comparison with that of the prior art in the form of sewing combination.

Concluded above, by way of the design of integral formation of the felt surface 11 with the plastic board 12, the adhesive tape that pattern and mark are easily formed thereon and the manufacture thereof can reach the purposes of obtaining the best combined strength, lessening the sewing work, efficiently simplifying the process, and reducing the costs. Meanwhile, a logo or trademark can be formed on the exposed surface of the board 12 for promotional and advertising purposes.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method for manufacturing an adhesive tape that pattern and mark are formed thereon comprising steps of:
   (a) taking an upper mold and a lower mold, among which one end of the upper mold is provided with a guide groove, the center thereof being provided with a sprue, and above the upper mold adjacent to the guide groove are provided with more than one formation areas, which are connected with the guide groove by way of more than one paths, while the lower mold has more than one bearing portions corresponding to the formation areas;
   (b) placing a felt portion on the bearing portion of the lower mold with the felted side contacting with the bearing portion, and then placing the upper mold correspondingly on the lower mold such that the back side of the felt portion can be corresponding to the formation area on the upper mold;
   (c) injecting a plastic material from the sprue through the guide groove to the formation area, such that the plastic material can be formed on the back side of the felt portion to shape into a plastic board;
   (d) removing the upper mold such that a pattern as that on the formation area can be obtained by way of plastic formation on a plastic board; accordingly, the manufacture method for constructing an adhesive tape that pattern and mark are formed thereon;
   wherein a groove is provided between the formation areas of the upper mold, more than on through holes are provided on the groove provided between the formation areas of the upper mold, a groove is provided between the bearing portions of the lower mold, an aperture is provided on the groove provided between the bearing portions of the lower mold, each of the bearing portions is provided with a butting mold having pluralities of aciculae, a periphery of the lower mold along an edge of the felt portion is clipped and fastened, in order to prevent the back side of the felted surface from floating due to flash by plastic material injected by high pressure.

* * * * *